United States Patent [19]

Colombet et al.

[11] Patent Number: 4,757,037
[45] Date of Patent: Jul. 12, 1988

[54] NEODYMIUM TITANATE AND BARIUM NEODYMIUM TITANATE, PROCESSES FOR THEIR PREPARATION, AND THEIR APPLICATIONS IN CERAMIC COMPOSITIONS

[75] Inventors: Jean-Francois Colombet, Rueil-Malmaison; Claude Magnier, Paris, both of France

[73] Assignee: Rhone-Poulenc Specialities Chimiques, Courbevoie, France

[21] Appl. No.: 835,213

[22] Filed: Mar. 3, 1986

[30] Foreign Application Priority Data

Mar. 1, 1985 [FR] France .................. 85 03024

[51] Int. Cl.[4] ............... C01G 23/00; C01F 17/00; C04B 35/46
[52] U.S. Cl. .................. 501/134; 501/139; 501/152; 501/135; 501/136; 423/598; 423/263
[58] Field of Search ........... 423/263, 598; 501/152, 501/134, 136, 135

[56] References Cited

U.S. PATENT DOCUMENTS

| 3,413,083 | 11/1968 | Daendliter | 423/263 |
| 3,577,487 | 5/1971 | Sanchez et al. | 264/56 |
| 3,637,531 | 1/1972 | Favon et al. | 423/263 X |
| 3,983,077 | 9/1976 | Fuller et al. | 252/520 |
| 4,061,583 | 12/1977 | Murata et al. | 252/62.3 B X |
| 4,173,485 | 12/1979 | Woditsch et al. | 501/136 |
| 4,520,004 | 5/1985 | Uedaira et al. | 423/598 |
| 4,537,865 | 8/1985 | Okabe et al. | 501/135 |
| 4,587,041 | 5/1986 | Uedaira et al. | 252/572 |
| 4,606,906 | 8/1986 | Ritter et al. | 423/598 |

FOREIGN PATENT DOCUMENTS

| 623770 | 7/1961 | Canada | 501/134 |
| 59-39722 | 3/1984 | Japan | 423/598 |
| 632176 | 11/1976 | U.S.S.R. | 423/263 |

OTHER PUBLICATIONS

"The Condensed Chem. Dic." 10th Ed. pp. 956 and 958.
Chemical Abstracts, vol. 75, No. 6, pp. 579–580 (1971), No. 44339v.
Ber. Dt. Keram, Ges. 55 (1978) (No. 7).

Primary Examiner—Mark L. Bell
Assistant Examiner—A. Knab
Attorney, Agent, or Firm—Burns, Doane, Swecker & Mathis

[57] ABSTRACT

A fine powder of neodymium titanate or barium neodymium titanate, a process for its preparation and applications in ceramic compositions. A suspension of particles is formed by mixing a solution of neodymium nitrate or a solution of barium and neodymium nitrates with a sol of titania having a pH of from about 0.8 to 2.5 which contains elementary crystallites of $TiO_2$ having a size of from about 10 to about 100 Å in diameter which are agglomerated into submicron masses of from about 200 to about 1,000 Å in diameter. The suspension obtained is dried, and the dried product is calcined at a temperature between 800° C. and 1,300° C., preferably for about 1 to 24 hours. If necessary, the powder obtained is milled. The fine powder obtained has a low fritting temperature and its density after heating for 2 hours at 1,300° C. is greater than or equal to 95% of the theoretical density of the desired titanate powder.

13 Claims, No Drawings

NEODYMIUM TITANATE AND BARIUM NEODYMIUM TITANATE, PROCESSES FOR THEIR PREPARATION, AND THEIR APPLICATIONS IN CERAMIC COMPOSITIONS

The present invention relates to a fine powder of neodymium titanate or barium neodymium titanate, a process for the preparation of such powder and applications of the powder in ceramic compositions utilized in the manufacture of capacitors or resistors.

Neodymium titanate and barium neodymium titanate are materials extensively utilized in the preparation of ceramic compositions. Various methods are known for the preparation of a ceramic of either neodymium titanate or barium neodymium titanate. It is known to prepare a ceramic of neodymium titanate or barium neodymium titanate by mixing a powder of titanium oxide, neodymium oxide or carbonate, and barium carbonate or barium titanate. In that process, the fritting reaction is carried out at temperatures greater than 1,400° C. (Ber. Dt. Keram. Ges. 55 (1978) No. 7).

The above described process has several disadvantages. The reaction and fritting must be carried out at high temperatures, entailing a considerable consumption of energy. Further, in the manufacture of a dielectric composition it is known to utilize, in addition to the neodymium titanate or barium neodymium titanate, materials which ensure contact between the different layers of titanate forming the dielectric. Since the reaction of fritting takes place at a high temperature, it is necessary to utilize materials which have high melting points to withstand these conditions. Thus, for example, in the case of capacitors, precious metals such as silver, platinum and palladium must be used.

The object of the present invention is to provide a neodymium titanate or barium neodymium titanate which can frit at a low temperature, resulting in a substantial saving of both energy and costs of raw materials.

Another object of the present invention is to provide a process which permits good reactivity between the components and produces powders possessing excellent homogeneity corresponding either to crystallographically pure phases or to an excellent distribution in each grain or agglomerate of the powder of the ions which compose it.

Another object of the present invention is to provide a neodymium titanate or barium titanate which frits rapidly and has a density which, when measured after heating for 2 hours at 1,300° C., is greater than or equal to 95% of the theoretical density of the desired titanate. Rapid fritting enables substantial economies in energy to be achieved and excellent productivity to be obtained.

Finally, an object of the present invention is to provide a barium neodymium titanate, the utilization of which in NPO formulations leads to capacitors in which the variation of the dielectric constant as a function of temperature is greatly reduced.

The present invention can produce a very fine powder of neodymium titanate or barium neodymium titanate having excellent reproducibility. This powder, which is uniformly stoichiometric at the microscopic level, is particularly suitable for the manufacture of ceramic products in association with other compounds by reaction in the solid state.

The process for preparing the fine powder of neodymium titanate or barium neodymium titanate according to the invention comprises the steps of forming a suspension of particles by mixing a solution of neodymium nitrate or a solution of barium and neodymium nitrates with a sol of titania having a pH of from about 0.8 to about 2.5 which contains elementary crystallites of $TiO_2$, of a size of from about 10 to 100 Å in diameter, which are agglomerated into submicron aggregates of sizes from 200 to 1,000 Å in diameter; drying the suspension obtained; calcining the dried product at a temperature of from about 800° to about 1,300° C. for a time sufficient to obtain a powder of neodymium titanate or barium neodymium titanate, preferably from about 30 minutes to about 24 hours; and if necessary, milling the powder obtained.

The sol of titania has a pH from about 0.8 to 2.5, preferably from 1.8 to 2.2, and contains elementary crystallites of $TiO_2$ of from about 10 to 100 Å in diameter, which are agglomerated into submicron aggregates of from about 200 to 1,000 Å in diameter. The sol can be obtained by any appropriate method, such as by peptization of a gel of titanium dioxide having the same sizes of elementary crystallites as the desired sol but comprising macroscopic aggregates of about one micron in size.

According to a preferred embodiment of the invention, a titanium dioxide gel is peptized such that its elementary crystallites are of about 50 Å in diameter and are agglomerated into submicron aggregates of about 400 Å in diameter, and the gel possibly contains macroscopic aggregates of one micron in diameter. The gel can be obtained by the conventional process of preparation of titanium dioxide by sulfuric attack on ilmenite and can contain from about 3 to 15% of sulfite ions, preferably from 6 to 8%. The pH of the aqueous suspension (300 g/l expressed as $TiO_2$) is from about 1 to 3. This gel can likewise be prepared by hot hydrolysis of a sulfuric solution of titanium oxychloride derived from $TiCl_4$.

The peptized gel which is composed essentially of water and $TiO_2$ should not have too low a concentration of $TiO_2$, since too great a content of water could make drying of the sol subsequently obtained during the process more difficult and more lengthy. On the other hand, it is found that too high a content of $TiO_2$ can also impede the proper course of the process. Preferably the starting peptized gel has a $TiO_2$ content of from about 5 to about 35% by weight, and more preferably, a peptized gel is utilized which has a $TiO_2$ content of 15%.

According to the process of the invention, a solution of neodymium nitrate or a solution of barium nitrate and neodymium nitrate is mixed with the sol or the suspension obtained by peptization of the gel. The concentration of barium nitrate in the solution is from about 2 to 20% by weight, preferably 2 to 5% by weight, expressed as either $Ba(NO_3)_2$ or $BaO$, and the concentration of neodymium nitrate in the solution is from about 5 to 60% by weight, preferably 25–30%, expressed as either $Nd(NO_3)_3 \cdot 6H_2O$ or $Nd_2O_3$. The solutions employed are preferably aqueous.

After the solution of neodymium nitrate or barium nitrate and neodymium nitrate has been added, a perfectly homogenous suspension of titania can be obtained in the solution of the other elements.

According to the invention, the relative proportions of barium, titanium and neodymium are not critical and may be readily chosen by one skilled in the art, without undue experimentation, based on the literature and descriptions of the final compositions having optimum ceramic characteristics.

The suspension obtained contains from about 3 to 35% of dry matter, which must be further dried by any known method, particularly, by atomization in which the solution is sprayed into a hot atmosphere. The free water is driven off, whereas water in such forms as hydroxides or water of crystallization is not driven off.

Drying is preferably carried out in a "flash" reactor. For example, the type perfected by Phone-Poulenc Industries and particularly described in French Pat. Nos. 2,257,326, 2,419,754, and 2,431,321, which correspond respectively to South African Patent No. 74.3871, U.S. Pat. No. 4,379,638 and South African Patent No. 79.3747, may be used. These patents are specifically incorporated by reference herein.

In the reactor, the gases are imparted a helicoidal motion and flow in a vortex well. The suspension is injected along a trajectory which coincides with the axis of symmetry of the helicoidal trajectories of the gases. The motion of the gases can be completely transferred to the particles of the suspension. Furthermore, the residence time of the particles in the reactor can be extremely short, less than 1/10 second, which eliminates any risk of overheating due to too long a contact of the suspension with the gases.

According to the respective throughputs of the gases and the suspension, the input temperature of the gases is from about 400° to 700° C., and the temperature of the dried solid is from about 150° to 350° C. Preferably, the temperature of the dried solid is about 230° C.

A dry product is obtained which can have particle diameters of the order of several microns, for example, from about 1 to about 10 microns. The dry product is then calcined.

Calcination is carried out at a temperature of from about 800° to 1,300° C., preferably from about 1,000° to 1,150° C. Calcination is preferably carried out from about 30 minutes to 24 hours, preferably, from about 6 to 15 hours.

After calcination, a powder of neodymium titanate or of barium neodymium titanate is obtained which has a macroscopic particle diameter distribution of from about 1 to 10 microns. The macroscopic particles are composed of elementary crystallites or submicron aggregates of about 500 to 8,000 Å in diameter.

The products obtained should be milled, if necessary, to obtain usable powders containing elementary crystallites from about 500 to 8,000 Å in diameter, preferably, from about 1,000 to 5,000 Å in diameter. The particle size distribution of the powder that can be obtained is from about 0.5 to 3 microns in diameter. As defined herein, a fine powder contains particles having a mean diameter less than or equal to about 3 microns.

A correlation of temperature and time of calcination with the dimensions of the particles shows that the lower the calcination temperature, the greater the calcination time required and accordingly, the higher the calcination temperature, the less time required.

The characteristics of the powder of neodymium titanate or of barium neodymium titanate were determined as follows: The titanate powder was mixed with a binder in a weight proportion of 2%, which was chosen from those well known in the art, for example, Rhodoviol 4/20 ® binder. The mixture was then pelletized under a pressure of 2T(Tons)/cm². Fritting was then carried out.

The powders obtained according to the invention possess particularly interesting properties. They frit at low temperature since their density, when measured at 1,300° C. after heating for 2 hours is greater than or equal to 95% of the theoretical density of the titanate.

The powders of the present invention can be utilized in the manufacture of resistors and NPO capacitors of low dielectric constant by processes and formulations known in these fields.

The following illustrative examples are not to be considered as limiting the scope or spirit of the invention.

EXAMPLE 1

The starting titania sol (1,066 g) was 15% by weight $TiO_2$. The pH of the suspension was 1.7. The suspension contained submicron aggregates of about 400 Å in diameter which were formed of elementary crystallites of about 50 Å in diameter.

The titania sol was mixed with 1,156 g of a solution of $Nd(NO_3)_3$ (29.1% by weight in $Nd_2O_3$; Nd/Ti ratio=1).

After homogenization by agitation for 15 minutes, the mixture was dried by atomization in a "flash" reactor as described in French Pat. Nos. 2,257,326, 2,419,754 and 2,431,321. The input temperature of the gases was 650° C., and the drying temperature was 230° C.

860 g of the dried product were obtained which contained spherical aggregates of particles between 1 and 10 microns in diameter.

The dried product was calcined at 1,050° C. for 6 hours. The rate of increase of temperature was 9° C. per minute. 496 g of $Ti_2Nd_2O_7$ were obtained. Crystallographic examination revealed the presence of the single crystallized phase $Ti_2Nd_2O_7$ and thus confirmed the excellent chemical homogeneity of the products obtained according to the process of the invention.

The neodymium titanate was then milled. The particle size distribution was from 0.5 to 3 microns in diameter. The size of the elementary crystallites was from 0.1 to 0.6 microns in diameter. The neodymium titanate was then dry pelletized under a pressure of $2T/cm^2$. The fritting was carried out at 1,300° C. for 2 hours (5° C./min. temperature rise). The density after fritting was equal to 95% of the theoretical density.

EXAMPLE 2

The starting titania sol (1,066 g) was 15% by weight $TiO_2$. The pH of the suspension was 1.7. The suspension obtained contained submicron aggregates of about 400 Å in diameter containing elementary crystallites of about 50 Å in diameter.

The titania sol was mixed with 578 g of a solution of $Nd(NO_3)_3$ (29.1% by weight in $Nd_2O_3$) and 4,000 g of a solution of $Ba(NO_3)_2$ (3.83% by weight in BaO). After homogenization by agitation for 15 minutes, the mixture was dried by atomization. The drying conditions were identical to those of Example 1.

668 g of dried product were obtained which contained spherical aggregates of from about 1 to 10 microns in diameter. The dried product was calcined under the same conditions as those of Example 1. 481 g of oxide were obtained corresponding to the following calculated empirical formula: $Ba_{0.5}Nd_{0.5}TiO_{3.25}$.

The barium neodymium titanate obtained was then milled. The particle size distribution was from 0.5 to 3 microns in diameter. The size of the elementary crystallites was from 0.1 to 0.5 microns in diameter. After fritting at 1,300° C. for 6 hours (same conditions as in Example 1), the density was equal to 96% of the theoretical density.

EXAMPLE 3

The characteristics of the titania sol were identical to those of Example 1. The titania sol (1,066 g) was mixed with 768.7 g of a solution of $Nd(NO_3)_3$ (29.1% by weight in $Nd_2O_3$) and 2,640 g of a solution of $Ba(NO_3)_2$ (3.83% by weight in BaO). After homogenization by agitation for 15 minutes, the mixture was dried by atomization, under the same conditions as in Example 1.

765 g of dried product were obtained which consisted of spherical aggregates of from 1 to about 10 microns in diameter. The dried product was calcined under the same conditions as those of Example 1. 481.5 g of oxide were obtained corresponding to the phase $BaNd_2Ti_3O_{10}$. Crystallographic examination confirmed the existence of the single phase and the excellent chemical homogeneity of the powder.

The barium neodymium titanate was then milled. The particle size distribution was from 0.5 to 3 microns in diameter. The size of the elementary crystallites was from 0.2 to 0.6 microns in diameter. After fritting at 1,300° C. for 6 hours (same conditions as in Example 1), the density was equal to 97% of the theoretical density.

What is claimed is:

1. A process for the preparation of a fine powder of neodymium titanate or of barium neodymium titanate, comprising the steps of:
   forming a suspension containing particles by mixing a sol of titania having a pH of from about 0.8 to 2.5 and containing elementary crystallites of $TiO_2$ having dimensions of from about 10 to 100 Å in diameter, which crystallites are agglomerated into submicron aggregates of $TiO_2$ having dimensions of from about 200 to 1,000 Å in diameter with a solution of neodymium nitrate or a solution of barium and neodymium nitrates;
   drying said suspension to obtain a dried product; and
   calcining the dried product at a temperature of from about 800° to 1,300° C. for a time sufficient to obtain said powder.

2. The process of claim 1 wherein said calcining is carried out from about 30 minutes to 24 hours.

3. The process of claim 2, wherein the concentration of barium nitrate in said solution is from about 2 to 20% by weight expressed as either $Ba(NO_3)_2$ or BaO and the concentration of neodymium nitrate in said solution is from about 5 to 60% by weight expressed as either $Nd(NO_3)_3.6H_2O$ or $Nd_2O_3$.

4. The process of claim 2 wherein said solution is neodymium nitrate and wherein the concentration of neodymium nitrate is 25 to 30% by weight.

5. The process of claim 4 wherein the concentration of neodymium nitrate is 29.1% by weight.

6. The process of claim 3 wherein said solution is neodymium nitrate and barium nitrate and wherein the concentration of neodymium nitrate is 25 to 30% by weight and the concentration of barium nitrate is 2 to 5% by weight.

7. The process of claim 6 wherein the concentration of neodymium nitrate is 29.1% by weight and the concentration of barium nitrate is 3.83% by weight.

8. The process of claim 1, wherein the drying step includes injecting the suspension into a gas reactor containing at least one gas given a helicoidal motion and flowing in a vortex well, and wherein said suspension is injected along a trajectory coincident with the axis of symmetry of the helicoidal trajectories of said gas to enable a complete transfer of the motion of said gas to the particles of the suspension; wherein the residence time in the reactor is less than about 1/10 second; wherein the input temperature of the gas is from about 400° to 700° C.; and wherein the temperature of the dried product is from about 150° to 350° C.

9. The process of claim 2, wherein the calcining temperature is from 1,000° to 1,150° C.

10. The process of claim 2, wherein the calcination time is from 6 to 15 hours.

11. The process of claim 1 wherein after calcining, the powder is milled to obtain elementary crystallites from about 500 to 8,000 Å in diameter.

12. The process of claim 11 wherein the powder is milled to obtain elementary crystallites from about 1,000 to 5,000 Å in diameter and wherein the powder has a particle size distribution from about 0.5 to 3 microns in diameter.

13. The process of claim 1, wherein said neodymium nitrate or barium and neodymium nitrates remain in solution until the solvent therefor is removed in the drying step.

* * * * *

UNITED STATES PATENT AND TRADEMARK OFFICE
CERTIFICATE OF CORRECTION

PATENT NO.  : 4,757,037
DATED       : July 12, 1988
INVENTOR(S) : Jean-Francois Colombet and Claude Magnier It is certified that error appears in the above-identified patent and that said Letters Patent is hereby corrected as shown below:

Column 2, line 63, change "homogenous" to -- homogeneous --.

Column 3, line 10, change "Phone" to -- Rhone --.

Signed and Sealed this

Thirteenth Day of June, 1989

*Attest:*

DONALD J. QUIGG

*Attesting Officer*   *Commissioner of Patents and Trademarks*

UNITED STATES PATENT AND TRADEMARK OFFICE
CERTIFICATE OF CORRECTION

PATENT NO. : 4,757,037

DATED : July 12, 1988

INVENTOR(S) : Jean-Francois Colombet and Claude Magnier

It is certified that error appears in the above-identified patent and that said Letters Patent is hereby corrected as shown below:

Column 2, line 34, change "sulfite" to sulfate.

Signed and Sealed this

Sixteenth Day of January, 1990

*Attest:*

JEFFREY M. SAMUELS

*Attesting Officer*  *Acting Commissioner of Patents and Trademarks*